US012691475B2

(12) United States Patent
Nakamura et al.

(10) Patent No.: US 12,691,475 B2
(45) Date of Patent: Jul. 28, 2026

(54) CONTAMINANT REMOVAL DEVICE AND CONTAMINANT REMOVAL METHOD

(71) Applicants: DENSO CORPORATION, Aichi (JP); HORIBA, LTD., Kyoto (JP)

(72) Inventors: Takanori Nakamura, Aichi (JP); Daisaku Sugi, Aichi (JP); Daisuke Uki, Aichi (JP); Takahiro Kawano, Aichi (JP); Toyoki Kanzaki, Kyoto (JP)

(73) Assignees: DENSO CORPORATION, Aichi (JP); HORIBA, LTD., Kyoto (JP)

( * ) Notice: Subject to any disclaimer, the term of this patent is extended or adjusted under 35 U.S.C. 154(b) by 512 days.

(21) Appl. No.: 18/027,257

(22) PCT Filed: Aug. 26, 2021

(86) PCT No.: PCT/JP2021/031402
§ 371 (c)(1),
(2) Date: Mar. 20, 2023

(87) PCT Pub. No.: WO2022/064950
PCT Pub. Date: Mar. 31, 2022

(65) Prior Publication Data

US 2023/0338994 A1 Oct. 26, 2023

(30) Foreign Application Priority Data

Sep. 24, 2020 (JP) ................................ 2020-159394

(51) Int. Cl.
*B08B 5/02* (2006.01)

(52) U.S. Cl.
CPC ........... *B08B 5/02* (2013.01); *B08B 2205/00* (2013.01)

(58) Field of Classification Search
CPC ................................................ B05B 5/00–046
See application file for complete search history.

(56) References Cited

U.S. PATENT DOCUMENTS

| | | | |
|---|---|---|---|
| 5,596,783 | A | 1/1997 | Testone |
| 2004/0003475 | A1 | 1/2004 | Mariani et al. |
| 2004/0020007 | A1 | 2/2004 | Lausevic |

(Continued)

FOREIGN PATENT DOCUMENTS

| | | |
|---|---|---|
| JP | 10-70069 | 3/1998 |
| JP | 2006-082058 | 3/2006 |

(Continued)

OTHER PUBLICATIONS

Notice of Reason for Refusal issued in JP patent application No. 2022-551218, dated Nov. 28, 2023.

(Continued)

*Primary Examiner* — Omair Chaudhri
(74) *Attorney, Agent, or Firm* — GREENBLUM & BERNSTEIN, P.L.C.

(57) ABSTRACT

In order to obtain a contaminant removal device capable of improving contaminant removal performance regardless of a structure formed on a surface of an object, in the contaminant removal device, contaminant attached to the object is removed by a gas sprayed out of a nozzle having a gas outlet, and an aperture ratio of opposing end portions of the gas outlet is set smaller than an aperture ratio of a central portion of the gas outlet.

10 Claims, 7 Drawing Sheets

(56) References Cited

U.S. PATENT DOCUMENTS

| | | | | |
|---|---|---|---|---|
| 2005/0205699 | A1 | 9/2005 | Bezama et al. | |
| 2010/0229902 | A1* | 9/2010 | Kanzaki | H01L 22/12 134/56 R |
| 2016/0296982 | A1 | 10/2016 | Hirakawa et al. | |

FOREIGN PATENT DOCUMENTS

| | | | |
|---|---|---|---|
| JP | 2010-000486 | | 1/2010 |
| JP | 2010-210527 | | 9/2010 |
| JP | 2010221121 | A * | 10/2010 |
| JP | 2016-201457 | | 12/2016 |
| JP | 2021-130070 | | 9/2021 |
| KR | 10-2005-0022099 | | 3/2005 |
| KR | 10-0739425 | | 7/2007 |
| KR | 10-2014-0063420 | | 5/2014 |
| KR | 10-2018-0045737 | | 5/2018 |

OTHER PUBLICATIONS

International Search Report issued in International Bureau of WIPO Patent Application No. PCT/JP2021/031402, dated Nov. 9, 2021.

Office Action issued in CN patent application No. 202180064157.9, dated May 14, 2025, and English translation.

Office Action issued in KR patent application No. 10-2023-7011915, dated Jun. 25, 2025, and English translation.

Decision to Grant issued in KR patent application No. 10-2023-7011915, dated Feb. 11, 2026, and English translation.

* cited by examiner

CONTAMINANT REMOVAL DEVICE AND CONTAMINANT REMOVAL METHOD

TECHNICAL FIELD

The present invention relates to a contaminant removal device and a contaminant removal method.

BACKGROUND ART

As a contaminant removal device for removing a contaminant from a surface of a semiconductor substrate or an insulator substrate on which a structure such as a transistor or a wiring has been formed (hereinafter, also referred to as a structure), or from a surface of a chip diced from such a substrate or of an electronic component, for example, Patent Document 1 discloses a device having a structure for spraying gas against a contaminant attached to a surface of a semiconductor wafer from the above, the gas being sprayed out of a gas outlet having a slit-like shape with a constant width. In the contaminant removal device, the flow rate or the flow velocity of the gas sprayed out of the gas outlet determines the performance of contaminant removal.

However, in the contaminant removal device, the gas sprayed out of the gas outlet onto the surface of the semiconductor wafer spreads radially at substantially constant flow rate or flow velocity in all directions, along the surface from the part hit by the gas.

For this reason, when there is structure having a low strength near a portion hit by the gas, for example, it is necessary to reduce the flow rate or the flow velocity of the gas that hits the structure to a level not damaging the structure. Therefore, conventionally, depending on the strength of the structure, it has been necessary to reduce the flow rate or flow velocity of the gas sprayed out of the gas outlet. This has created a bottleneck, and presented a difficulty in improving the performance of contaminant removal, disadvantageously.

CITATION LIST

Patent Literature

Patent Literature 1: JP 2016-201457 A

SUMMARY OF INVENTION

Technical Problem

Therefore, a main object of the present invention is to obtain a contaminant removal device capable of improving the performance of contaminant removal, regardless of the structure provided on a surface of an object.

Solution to Problem

A contaminant removal device according to the present invention is a contaminant removal device that removes a contaminant attached to an object, using a gas sprayed out of a nozzle provided with a gas outlet, and is characterized in that opposing end portions of the gas outlet have a smaller aperture ratio than that in a central portion of the gas outlet. The "aperture ratio" herein according to the present invention refers to a ratio of an area of an opening with respect to a unit length of the gas outlet in a direction connecting opposing ends of the gas outlet (hereinafter, also referred to as an opposing-end direction), and the gas outlet has a highest aperture ratio in the central portion. For example, the aperture ratio may be expressed as a percentage calculated by $(S/(L \cdot W)) \times 100$, where L denotes the unit length; W denotes the maximum width of the gas outlet (the length of the gas outlet in a direction orthogonal to the opposing-end direction); and S denotes the area of the opening within the unit length.

With such a configuration, because the gas outlet has a smaller aperture ratio in the opposing end portions than in the central portion, the gas is sprayed at a lower flow rate in the opposing end portions than in the central portion of the gas outlet. As a result, compared with the flow rate or the flow velocity of the gas having been sprayed out of the gas outlet onto the surface of the object and flowing in a direction orthogonal to the opposing-end direction of the gas outlet (hereinafter, also referred to as an orthogonal direction), the flow rate or flow velocity in other directions (directions other than the orthogonal direction) can be reduced. Therefore, for example, assuming that a structure provided on the surface of an object is particularly easily damaged by a force applied from a predetermined direction, by not matching the orthogonal direction of the gas outlet with the predetermined direction, the flow rate or the flow velocity of the gas hitting the structure from the predetermined direction can be reduced. In this manner, the structure is less likely to become damaged, compared with a conventional contaminant removal device, even with the same flow rate is used at the blower. In other words, as compared with the conventional contaminant removal device, the flow rate or the flow velocity of the gas sprayed out of the gas outlet can be increased while maintaining the flow rate or the flow velocity of the gas hitting the structure from the predetermined direction to a level not damaging the structure. Therefore, the contaminant removal performance can be improved.

The gas outlet may have aperture ratios becoming smaller continuously or incrementally from the central portion toward the opposing ends of the gas outlet.

With such a configuration, because the aperture ratios are set to become gradually smaller from the central portion toward the opposing ends across the gas outlet, the flow rate of the gas sprayed out of the gas outlet is set to become gradually reduced, from the central portion toward the opposing ends. As a result, nearby streams of the gas sprayed from the gas outlet to the surface of the object cancel out components in directions other than the orthogonal direction of the gas outlet. As a result, because it becomes possible to minimize the flow rate or the flow velocity of the gas sprayed from the gas outlet to the surface of the object and flowing in directions other than the orthogonal direction of the gas outlet, the contaminant removal performance can be further improved The nozzle may include a nozzle body provided with a channel through which the gas flows, and a mask member that partially closes a leading end of the channel and that delineates the gas outlet.

With such a configuration, because the mask member can be used to define the shape of the gas outlet, the gas outlet can be formed easily.

As a specific embodiment of the present invention, closure plates may define a plurality of apertures in the gas outlet.

Furthermore, as a specific embodiment of the present invention, the mask member includes a plurality of first closure plates that extend in a direction orthogonal to an opposing-end direction of the gas outlet, and that are installed in the opposing-end direction at equal intervals;

and a second closure plate that extends in the opposing-end direction and that is installed between adjacent ones of the first closure plates, and, the number of the second closure plates installed between the adjacent first closure plates is greater on sides nearer to the opposing ends of the gas outlet.

In addition, the object may be a semiconductor wafer on which a plurality of structures are arranged in a length direction and a width direction, respectively; the structures may have a lower strength against a force applied from a predetermined direction than against a force applied from a direction other than the predetermined direction; and the nozzle may be installed in an orientation in which a direction orthogonal to the opposing-end direction of the gas outlet is not matched with the predetermined direction.

With such a configuration, because the orthogonal direction of the gas outlet is not matched with the predetermined direction, the gas being sprayed from the gas outlet to the surface of the semiconductor wafer and flowing in the orthogonal direction of the gas outlet does not flow in the predetermined direction. In this manner, as compared with the conventional contaminant removal device, the flow rate or the flow velocity of the gas sprayed out of the gas outlet can be increased while maintaining the flow rate or the flow velocity of the gas hitting the structures from the predetermined direction to a level not damaging the structure, even with the same blower flow rate. Therefore, the contaminant removal performance can be improved.

As a specific embodiment of the present invention, the structures have a lower strength against a force applied from a diagonal direction with respect to a direction in which the structures are arranged, than against a force applied from a direction other than the diagonal direction, and the nozzle is installed in an orientation in which a direction orthogonal to opposing-end direction of the gas outlet is not matched with the diagonal direction.

In addition, a moving mechanism that moves the object and the nozzle relatively to each other may be further provided.

With such a configuration, because the object and the nozzle can be moved relatively to each other, the gas outlet of the nozzle can be positioned above any position on the surface of the object, and the contaminant can be easily removed.

Furthermore, a contaminant removal method according to the present invention is a contaminant removal method for removing a contaminant attached to a surface of an object in which a plurality of structures are arranged in a length direction and a width direction, using a gas sprayed out of a nozzle having a gas outlet, wherein the structures have a lower strength against a force applied from a predetermined direction, than against a force applied from a direction other than the predetermined direction; an aperture ratio of each of opposing end portions of the gas outlet is smaller than an aperture ratio of a central portion of the gas outlet; and the nozzle is disposed in an orientation in which a direction orthogonal to an opposing-end direction of the gas outlet is not matched with the predetermined direction.

With such a configuration, because the predetermined direction is not matched with the direction orthogonal to the opposing-end direction of the gas outlet having a smaller aperture ratios in the opposing end portions than in the central portion, the flow rate or the flow velocity of the gas flowing in the predetermined direction can be reduced, as compared with the gas flowing in the direction orthogonal to the gas outlet, after being sprayed from the gas outlet to the surface of the object. Therefore, even if the blower flow rate is the same, the flow rate or the flow velocity of the gas hitting the structures from the predetermined direction can be reduced, compared with the conventional contaminant removal device, so that the structures get damaged less easily. In other words, as compared with the conventional contaminant removal device, the flow rate or the flow velocity of the gas sprayed out of the gas outlet can be increased while maintaining the flow rate or the flow velocity of the gas hitting the structure from the predetermined direction to a level not damaging the structure. Therefore, the contaminant removal performance can be improved.

Advantageous Effects of Invention

With the contaminant removal device configured as described above, the contaminant removal performance can be improved regardless of the structure provided on a surface of an object.

REFERENCE SIGNS LIST

Figure 1:
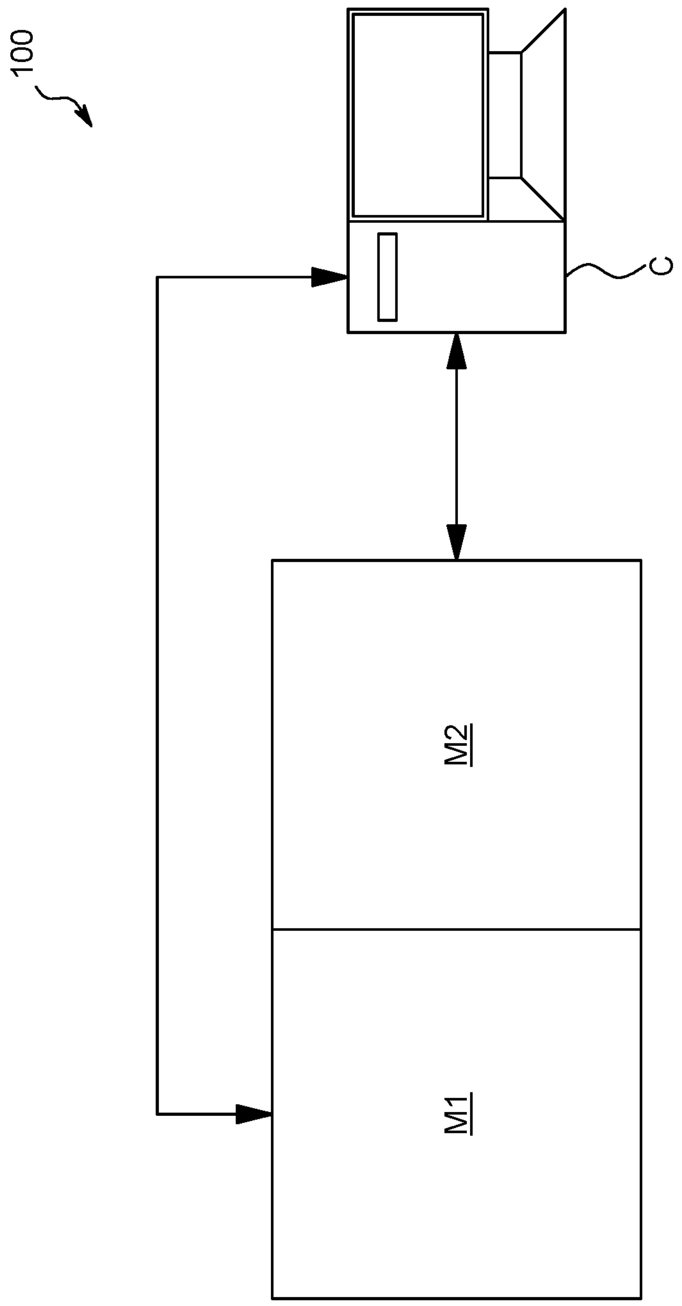
FIG. 1 is a schematic diagram illustrating an overall configuration of a contaminant inspection and removal device according to a first embodiment.

100 contaminant inspection and removal device
W substrate (object)
W1 surface
T structure
D diagonal direction (predetermined direction)
M1 contaminant inspection device
M2 contaminant removal device
N nozzle
30 nozzle body
34 gas outlet
34*h* aperture
34*x* central portion
34*y* opposing end portions
α opposing-end direction
40 mask member
41 first closure plate
42 second closure plate

DESCRIPTION OF EMBODIMENTS

A contaminant removal device according to the present invention will now be explained with reference to some drawings.

The contaminant removal device according to the present invention is used as a contaminant inspection and removal device, for example. This contaminant inspection and removal device inspects for and removes a contaminant attached to a surface W1 of a semiconductor substrate W (e.g., a Si wafer or a SiC wafer) in which a plurality of structures (e.g., transistors or wirings) are arranged in a length direction and a width direction. Note that the contaminant inspection and removal device is not limited to that for semiconductor substrates, and may be used for any object having a surface provided with a structure that becomes easily damaged by a force applied in a predetermined direction. For example, the contaminant inspection and removal device may also be used for an insulator substrate (e.g., a sapphire substrate), a chip diced from such a substrate (e.g., MEMS, sensor element, or SAW device), or an electronic component (such as an HDD element). The contaminant removal device may also be used by itself.

First Embodiment

A contaminant inspection and removal device 100 according to the present embodiment removes a contaminant attached to a surface W1 of the substrate W subjected to the inspection and removal, and includes a contaminant inspection device M1, a contaminant removal device M2, and a control unit C, as illustrated in FIG. 1. The contaminant inspection device M1 and the contaminant removal device M2 are provided next to each other, and enabled to receive and to pass the substrate W via a transfer mechanism (not illustrated) therebetween.

Figure 4:
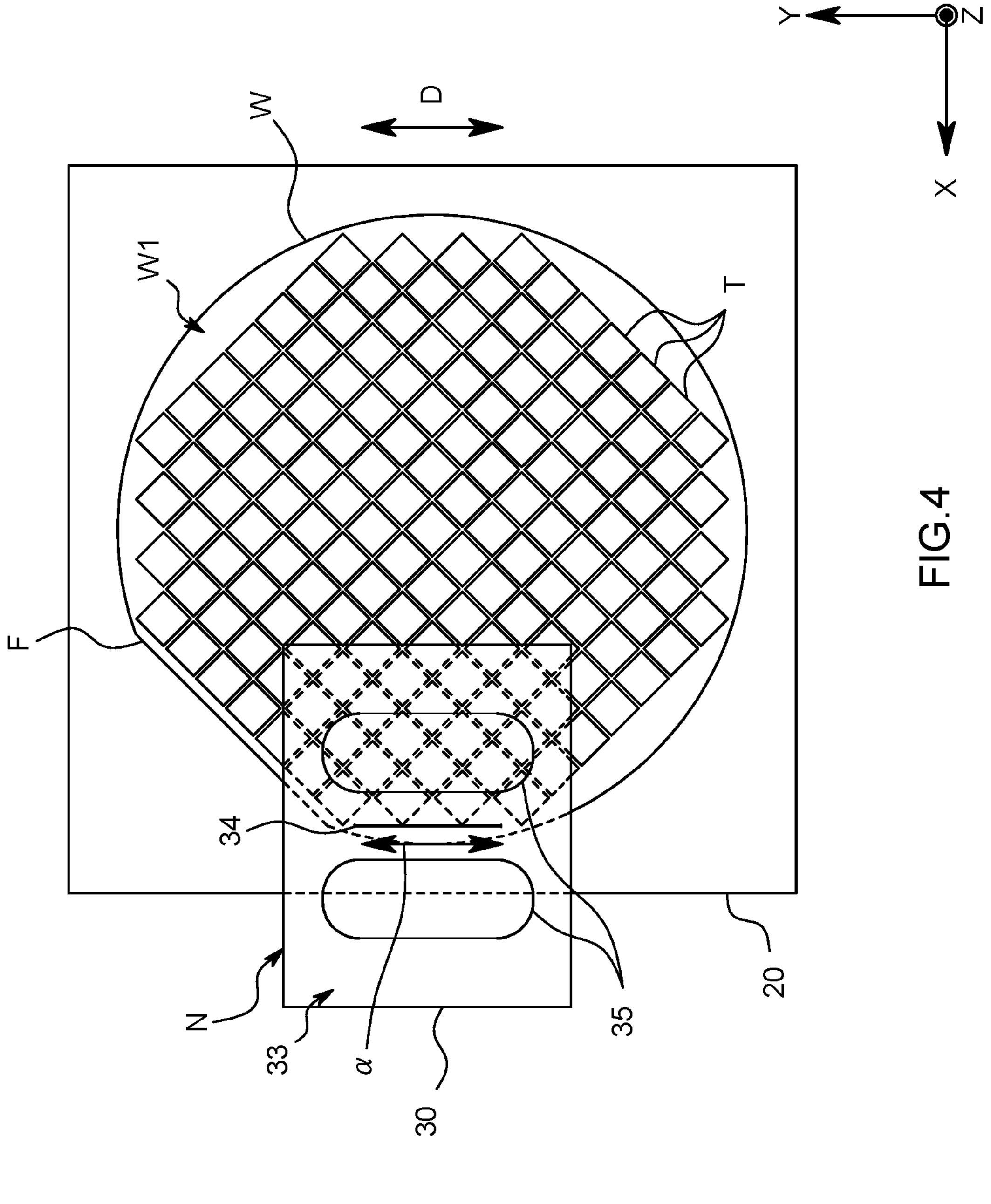
FIG. 4 is a schematic diagram illustrating the contaminant removal device according to the first embodiment.

In the explanation hereunder, it is assumed that the substrate W has a disk-like shape, and has an orientation flat F (hereinafter, it is also referred to as a flat F) that is formed by linearly cutting off a part of an outer periphery of the substrate W, as illustrated in FIG. 4. In addition, establishing the direction in which the flat F extends as a width direction, and establishing the direction orthogonal to the direction the flat extends as a length direction, a plurality of structures T are arranged in the length direction and the width direction on the surface W1 of the substrate W. The structures T are more vulnerable to a force applied in a diagonal direction D being diagonal to the directions in which the structures T are arranged and extending along the surface W1 of the substrate W, than to a force applied in other directions (a direction different from the diagonal direction D). Therefore, the diagonal direction D corresponds to a predetermined direction as used in the claims.

Figure 2:
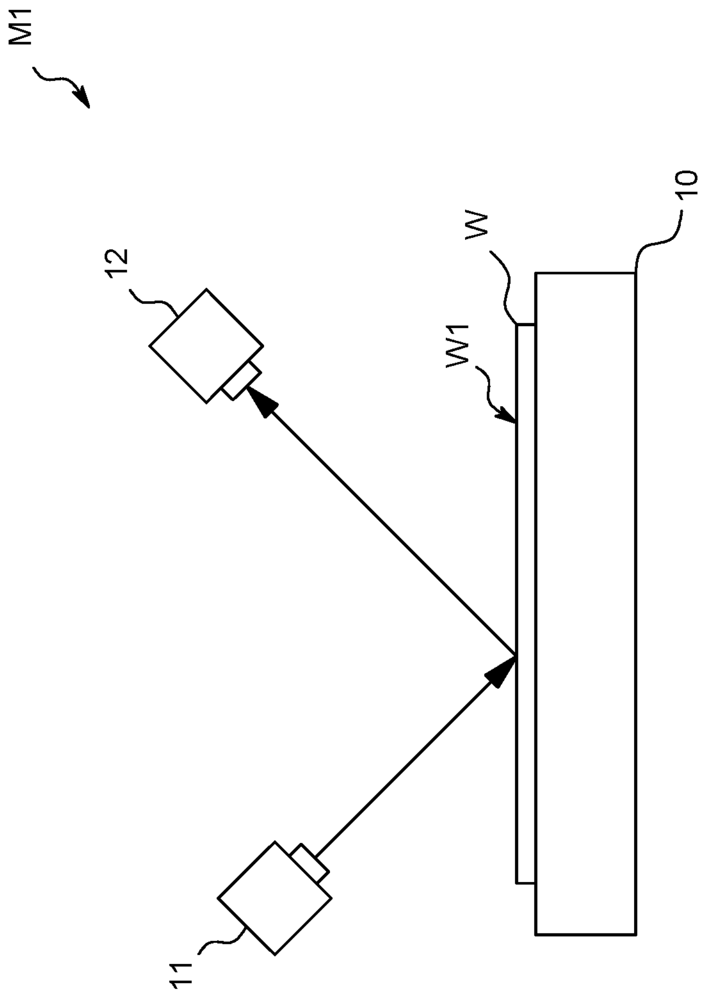
FIG. 2 is a schematic diagram illustrating a contaminant inspection device according to the first embodiment.

The contaminant inspection device M1 is a light scattering inspection device that acquires contaminant information such as the presence or absence, the size, and the position of a contaminant attached to the surface W1 of the substrate W. Specifically, as illustrated in FIG. 2, the contaminant inspection device M1 includes an inspection moving stage 10 on which the substrate W is placed, a light emitter unit 11 that scans the surface W1 of the substrate W placed on the inspection moving stage 10 by irradiating the surface W1 with inspection light, and a photodetector unit 12 that detects the light reflected and scattered from the surface W1 of the substrate W irradiated with the inspection light.

Figure 3:
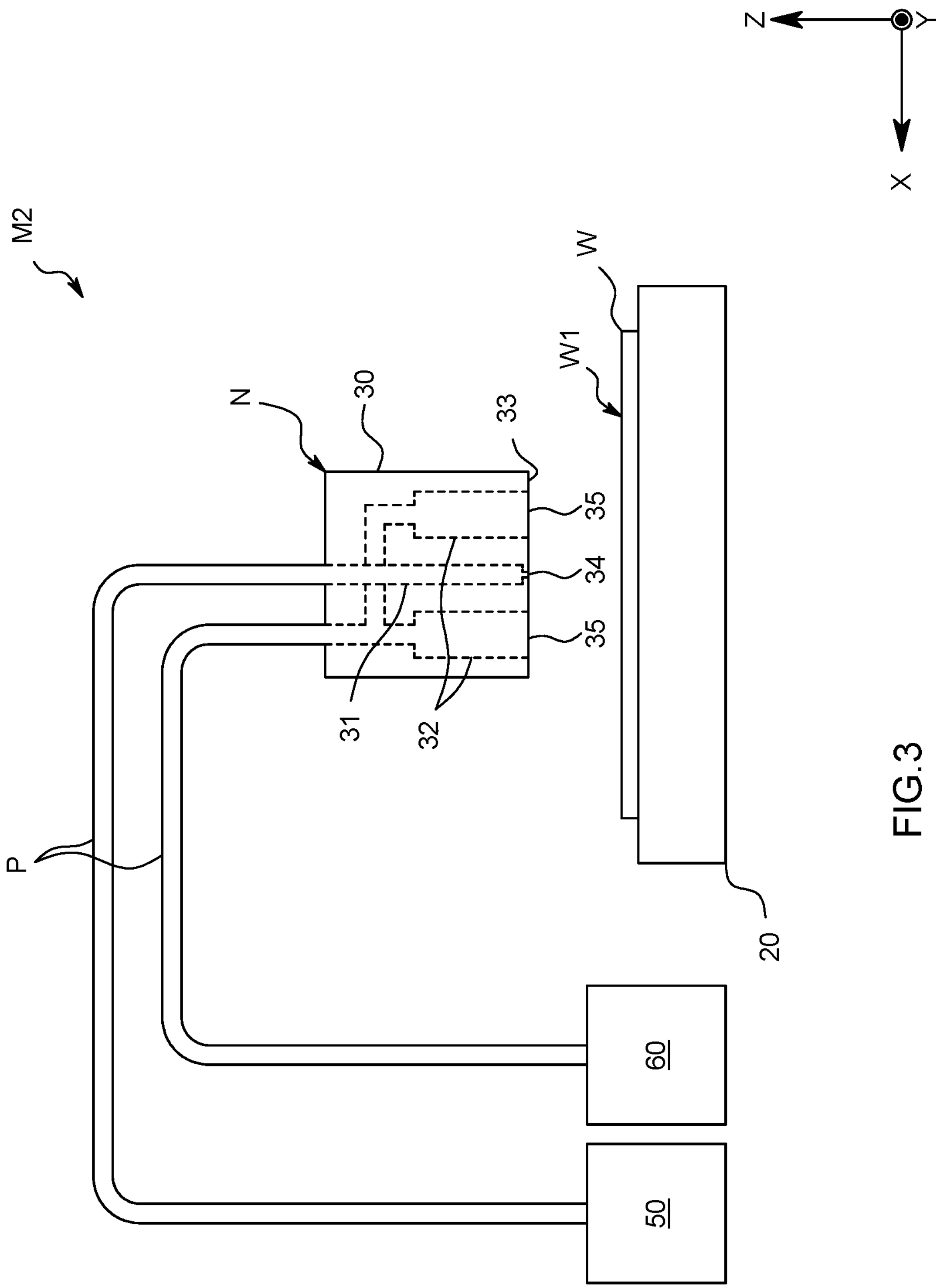
FIG. 3 is a schematic diagram illustrating a contaminant removal device according to the first embodiment.

The contaminant removal device M2 blows a gas toward the contaminant attached to the surface W1 of the substrate W to blow off the contaminant, and sucks to remove the contaminant having been blown off. Specifically, as illustrated in FIGS. 3 and 4, the contaminant removal device M2 includes a removal moving stage 20 on which the substrate W is placed, and a nozzle N disposed in a manner facing the substrate W that is placed on the removal moving stage 20. Examples of the gas includes the air, an inert gas, and a gas mixed with liquid droplets.

The removal moving stage 20 is movable in the X direction, the Y direction, and the Z direction, and moves the substrate W relatively with respect to the nozzle N. Therefore, the removal moving stage 20 corresponds to a moving mechanism as used in the claims.

The substrate W is positioned and placed on the removal moving stage 20 in such an orientation that the directions in which the plurality of structures T are arranged are diagonal to the X direction and the Y direction. In other words, the substrate W is positioned and placed on the removal moving stage 20 in such an orientation that the directions in which the flat F extends is diagonal to the X direction and the Y direction. Therefore, the substrate W is placed on the removal moving stage 20 in such a manner that the diagonal direction D, which is the direction in which the structures T are structurally weak, extends in parallel with the moving direction of the removal moving stage 20 (specifically, with the Y direction).

The nozzle N includes the nozzle body 30 and the mask member 40.

The nozzle body 30 includes a blower channel 31 through which the gas to be sprayed flows, and a pair of suction channels 32 through which the gas to be sucked flows. The nozzle body 30 is provided with the gas outlet 34 formed at the leading end of the blower channel 31, and a suction port 35 formed at the leading end of the suction channel 32, both on a surface 33 facing the surface W1 of the substrate W placed on the removal moving stage 20.

A blower 50 installed outside the contaminant removal device M2 is connected to the other end of the blower channel 31 via a pipe P, the other end being on the opposite side of the leading end where the gas outlet 34 is provided. In addition, a suction device 60 installed outside the contaminant removal device M2 is connected to the other end of the suction channel 32 via a pipe P, the other end being on the opposite side of the leading end where the suction port 35 is provided.

Figure 5:
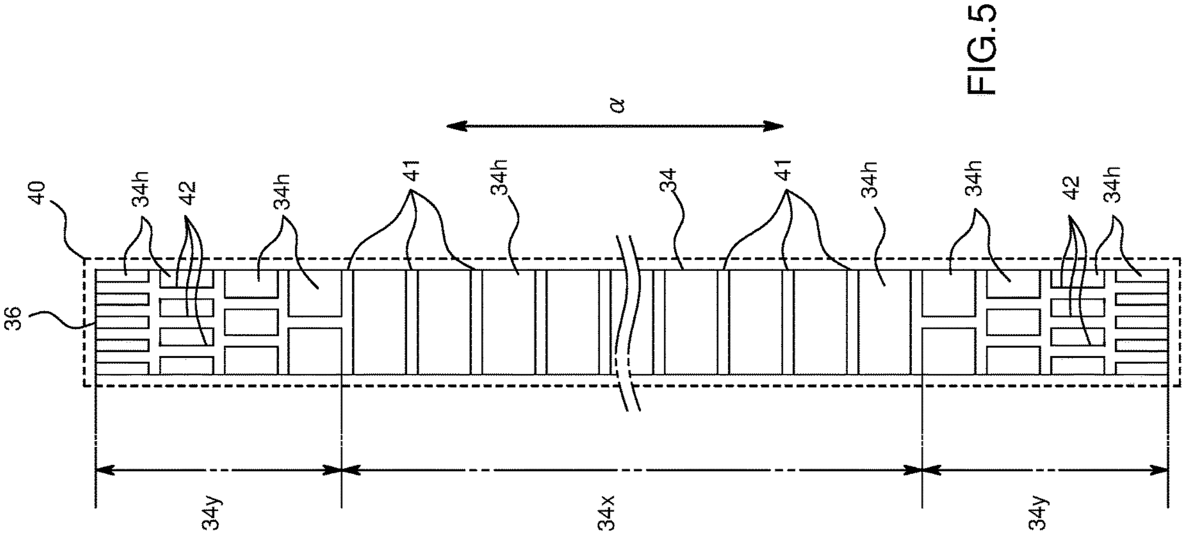
FIG. 5 is an enlarged schematic diagram illustrating a gas outlet of a nozzle according to the first embodiment.

As illustrated in FIG. 5, the gas outlet 34 has an elongated rectangular shape. Specifically, the gas outlet 34 has some closed parts on the leading end of the blower channel 31, being closed by the mask member 40, and has a plurality of apertures 34*h*. As for an aperture ratio of the gas outlet, 34, the aperture ratio is smaller in opposing end portions 34*y*, than in a central portion 34*x*. Specifically, the aperture ratio gradually becomes smaller from the central portion 34*x* toward the opposing ends of the gas outlet 34. The nozzle N is disposed in an orientation in which a direction orthogonal to a direction connecting opposing ends of the gas outlet 34 (hereinafter, an opposing-end direction $\alpha$) is not matched with the diagonal direction D that is the direction where the structures T are structurally weak, the structures T being formed on the substrate W that is placed on the removal moving stage 20 (see FIG. 4). In the present embodiment, the nozzle N is disposed in such a manner that the opposing-end direction $\alpha$ of the gas outlet 34 is matched with the diagonal direction D.

The plurality of apertures 34*h* provided in the central portion 34*x* all have the same area, and are arranged at equal intervals along the opposing-end direction $\alpha$ of the gas outlet 34. Therefore, the aperture ratio remains the same across the central portion 34*x* of the gas outlet 34, in the opposing-end direction $\alpha$ of the gas outlet 34.

The plurality of apertures 34*h* provided on the opposing end portions 34*y* are arranged along the direction orthogonal to the opposing-end direction $\alpha$ of the gas outlet 34, the plurality of apertures 34*h* having the same opening area. The plurality of apertures 34*h* thus arranged are greater in number on the side further toward the opposing ends of the gas outlet 34, and have smaller areas of the openings on the side nearer to the opposing ends of the gas outlet 34. The total opening areas of the plurality of the apertures 34*h* that are arranged along the direction orthogonal to the opposing-end direction α of the gas outlet 34 is smaller on the side further toward each of the opposing ends. Specifically, the total area become smaller on the side further toward the opposing ends, at the same rate of change. Therefore, the aperture ratio in the opposing end portions 34*y* of the gas outlet 34 becomes smaller from the sides near the central portion 34*x* toward the sides near the opposing ends of the gas outlet 34, at the same rate.

The plurality of apertures 34*h* are provided symmetrically with respect to the center of the gas outlet 34 in the opposing-end direction α, and are provided symmetrically with respect to the center of the gas outlet 34 in the direction orthogonal to the opposing-end direction α. Accordingly, the opposing end portions 34*y* of the gas outlet 34 have the same length in the opposing-end direction α. The opposing end portions 34*y* of the gas outlet 34 are both shorter in length than the central portion 34*x* in the opposing-end direction α.

The suction ports 35 are disposed in such a manner that their longitudinal directions coincide with the opposing-end direction α of the gas outlet 34, and are provided on both sides of the gas outlet 34, respectively. Both of the suction ports 35 are provided at positions separated by the same distance from the gas outlet 34.

The mask members 40 include a plurality of closure plates 41 and 42. The plurality of closure plates 41 and 42 form the gas outlet 34 by closing some parts of the slit-shaped original gas outlet 36 provided on the leading end of the blower channel 31 and having the constant width. Specifically, the mask members 40 are provided on the leading end of the blower channel 31, with a space between the mask members 40 in the opposing-end direction of the gas outlet 34, and include first closure plates 41 extending in the direction orthogonal to the opposing-end direction (the width direction of the gas outlet 34), and second closure plates 42 provided between the adjacent first closure plates 41 and extending in the opposing-end direction. The first closure plates 41 are provided along the opposing-end direction of the gas outlet 34 at equal intervals. A larger number of the second closure plates 42 are disposed between the adjacent first closure plates 41, on the side nearer to the opposing ends of the gas outlet 34. The mask members 40 partition the original gas outlet 36 with the closure plates 41 and 42, to form a plurality of apertures 34*h* together forming the gas outlet 34.

Figure 6:
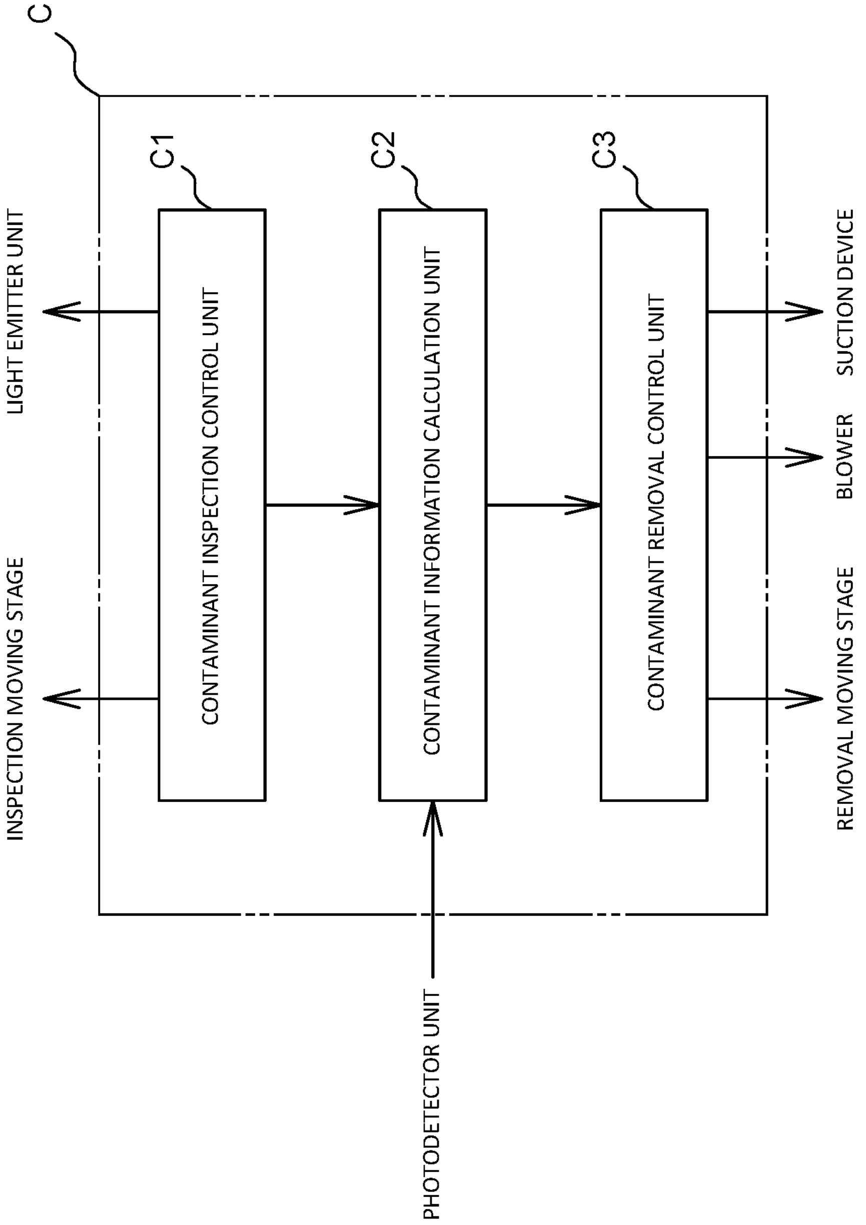
FIG. 6 is a functional block diagram illustrating a control unit according to the first embodiment.

The control unit C is what is called a computer that is connected to the contaminant inspection device M1 and the contaminant removal device M2 to control the devices M1 and M2. Specifically, the control unit C includes a CPU, an internal memory, an external memory, an input/output interface, and an AD converter, and is configured to exert functions as a contaminant inspection control unit C1, a contaminant information calculation unit C2, and a contaminant removal control unit C3, and the like as illustrated in FIG. 6, by causing the CPU, its peripheral devices, and the like to operate based on a program stored in a predetermined area of the internal memory or the external memory.

The contaminant inspection control unit C1 outputs control signals to the inspection moving stage 10 and the light emitter unit 11, controls to move the inspection moving stage 10 in a predetermined direction at a constant speed during an inspection, and controls to cause the light emitter unit 11 to scan the inspection light in a manner synchronized with the movement.

The contaminant information calculation unit C2 receives the control signals output from the contaminant inspection control unit C1 to the inspection moving stage 10 and the light emitter unit 11, and calculates irradiation position data indicating the position irradiated with the light, on the surface W1 of the substrate W, based on the control signals. The contaminant information calculation unit C2 receives a light intensity signal of reflected scattered light from the photodetector unit 12. The reflected scattered light herein is resultant of irradiating the light irradiation position indicated by the irradiation position data, with the inspection light. The contaminant information calculation unit C2 then calculates contaminant information on the surface W1 of the substrate W, based on the irradiation position data and the light intensity signal. Examples of the contaminant information include the presence or absence, and the size and position of a contaminant on the surface W1 of the substrate W.

The contaminant removal control unit C3 receives contaminant information data indicating contaminant information from the contaminant information calculation unit C2, and controls the blower 50, the suction device 60, and the removal moving stage 20, based on the contaminant information data. Specifically, the contaminant removal control unit C3 determines whether the contaminant attached to the surface W1 of the substrate W corresponds to an object to be removed, based on the contaminant information data. When the contaminant removal control unit C3 determines that the contaminant corresponds to an object to be removed, the contaminant removal control unit C3 controls the blower 50 to spray the gas from the gas outlet 34 onto the substrate W, while controlling the removal moving stage 20 to move the gas outlet 34 and the substrate W relatively to each other, so as to blow off the attached contaminant, and controls the suction device 60 to suck the contaminant having been blown off, via the suction port 45.

An operation of the contaminant inspection and removal device 100 according to the present embodiment will now be explained.

To begin with, the substrate W is placed on the inspection moving stage 10 of the contaminant inspection device M1.

The contaminant inspection control unit C1 then controls the inspection moving stage 10 and the light emitter unit 11 to irradiate and to scan the entire surface W1 of the substrate W with the inspection light. During this scanning, the contaminant information calculation unit C2 receives a control signal from the contaminant inspection control unit C1 and a light intensity signal detected by the photodetector unit 12, and calculates the contaminant information of the contaminant on the surface W1 of the substrate W.

The conveyance mechanism is then caused to convey the substrate W placed on the inspection moving stage 10 onto the removal moving stage 20. Note that the substrate W conveyed onto the removal moving stage 20 by the conveyance mechanism is positioned on the removal moving stage 20 in such a manner that the direction in which the structures T are arranged is positioned diagonally to the X direction and the Y direction, which are the directions in which the removal moving stage 20 is moved.

The contaminant removal control unit C3 then receives the contaminant information data from the contaminant information calculation unit C2, and determines whether the contaminant corresponds to an object to be removed. If it is determined that the contaminant corresponds to an object to be removed, the contaminant removal control unit C3 controls the blower 50, the suction device 60, and the removal moving stage 20 to remove the contaminant attached to the surface W1 of the substrate W by spraying the gas against the contaminant. Specifically, the contaminant removal control unit C3 removes the contaminant by moving the gas outlet 34 and the substrate W relatively to each other so that the gas outlet 34 is moved in a zigzag trajectory with respect to the substrate W. More specifically, the contaminant removal control unit C3 repeats an operation of removing contaminants by spraying the gas sprayed out of the gas outlet 34 to the substrate W while moving the gas outlet 34 in the X direction with respect to the substrate W, and an operation of moving the gas outlet 34 in the Y direction with respect to the substrate W, alternatingly. In this manner, the contaminant removal operation is applied to the entire surface W1 of the substrate W. As a result, the nozzle N is caused to move with respect to the substrate W while keeping the opposing-end direction of the gas outlet 34 in parallel with the diagonal direction D, which is the direction in which the structures T are structurally weak.

The conveying mechanism then conveys the substrate W placed on the removal moving stage 20 again onto the inspection moving stage 10, and the contaminant inspection device M1 is caused to inspect whether the contaminant attached to the surface W1 of the substrate W has been removed. The reliability of the contaminant removal can be improved by repeating the series of inspecting and removing operations.

With such a configuration, because the aperture ratio of the slit-shaped gas outlet 34 gradually decreases from the central portion 34$x$ toward opposing ends, the flow rate of the gas sprayed out of the apertures 34$h$ in the gas outlet 34 gradually decreases from the central portion 34$x$ toward opposing ends. As a result, after the gas is sprayed out of the gas outlet 34 onto the surface W1 of the substrate W, it is possible, compared with the flow rate or the flow velocity of the gas flowing in the direction orthogonal to the opposing-end direction $\alpha$ of the gas outlet 34, to reduce the flow rate or the flow velocity of the gas flowing in the other directions as much as possible. Therefore, if the direction orthogonal to the opposing-end direction of the gas outlet 34 is not matched with the diagonal direction D that is the direction in which the structures T are structurally weak, the flow rate or the flow velocity of the gas hitting the structures T from the predetermined direction can be reduced as compared with the conventional contaminant removal device even at the same blower flow rate, and the structures do not easily get damaged. In other words, as compared with the conventional contaminant removal device, the flow rate or the flow velocity of the gas sprayed out of the gas outlet 34 can be increased while maintaining the flow rate or the flow velocity of the gas hitting the structures T from the diagonal direction D to a level not damaging the structures T, so that the contaminant removal performance can be improved.

Other Embodiments

The gas outlet may have a plurality of apertures, or may include one aperture. The apertures of the gas outlet may be delineated by the mask members, or may be delineated by the leading end of the blower channel. In other words, the nozzle body itself may have the apertures.

The gas outlet may have a shape other than an elongated shape, such as a square shape or a circular shape. Furthermore, in the elongated gas outlet, the aperture ratio in the opposing end portions in the width direction may be configured to be smaller than the aperture ratio at the central portion.

Figure 7:
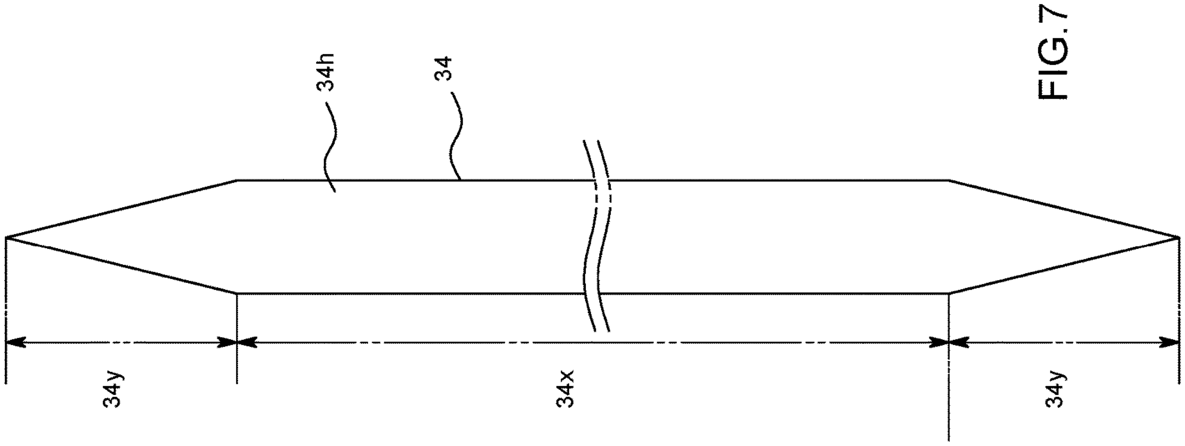
FIG. 7 is an enlarged schematic diagram illustrating a gas outlet of a nozzle according to another embodiment.

As illustrated in FIG. 7, the gas outlet 34 may have one aperture 34$h$, and the aperture 34$h$ may be tapered toward the opposing ends. In this manner, the aperture ratio may continuously decrease from the central portion 34$x$ of the gas outlet 34 toward opposing ends.

The aperture of the gas outlet may be asymmetrical with respect to one or both of a center in the opposing-end direction of the gas outlet and a center in a direction orthogonal to the opposing-end direction.

In the gas outlet, a length of each of opposing end portions in the opposing-end direction may be equal to or longer than a length of the central portion in opposing-end direction. Furthermore, the lengths of opposing end portions in the opposing-end direction may be different from each other.

It is also possible for the nozzle not to include the suction ports.

Furthermore, in the contaminant removal device, the nozzle may be moved instead of the removal moving stage, or both of the removal moving stage and the nozzle may be moved.

The contaminant inspection device may also use transmission imaging. In this case, one of the light emitter unit and the photodetector unit may be installed on a front surface side of the substrate, the other may be installed on a rear surface side of the substrate, and the photodetector unit may be caused to detect the light output from the light emitter unit to the front surface of the substrate and transmitted through the substrate.

In addition, if the contaminant removal control unit determines that the contaminant attached to the surface of the substrate corresponds to an object to be removed, based on the contaminant information data, the contaminant removal control unit may move the gas outlet to a position immediately above the position where the contaminant is detected on the substrate, and then spray the gas through the gas outlet to the substrate to remove the contaminant.

In addition, the present invention is not limited to the embodiment described above, and it should be needless to say that various modifications may be made within the scope not deviating from the gist of the present invention.

INDUSTRIAL APPLICABILITY

According to the present invention, it is possible to provide a contaminant removal device exerting sufficient contaminant removal performance, regardless of the structure formed on the surface of the object.

The invention claimed is:

1. A contaminant removal device for removing a contaminant attached to an object, comprising:

a nozzle provided with a gas outlet that sprays gas to remove the contaminant, wherein the gas outlet is formed by a plurality of aperture elements, wherein first aperture elements, from among the plurality of aperture elements, provided in opposing end portions of the gas outlet have smaller aperture areas than second aperture elements, from among the plurality of aperture elements, provided in a central portion of the gas outlet, and wherein the opposing end portions of the gas outlet have a smaller aperture ratio than that in the central portion of the gas outlet.

2. The contaminant removal device according to claim 1, wherein the aperture ratio becomes smaller continuously or incrementally from the central portion toward opposing ends of the gas outlet.

3. The contaminant removal device according to claim 1, wherein the nozzle includes a nozzle body provided with a channel through which the gas flows, and a mask that partially closes a leading end of the channel and that delineates the gas outlet.

4. The contaminant removal device according to claim 3, wherein each of the plurality of aperture elements is separated by a closure plate.

5. The contaminant removal device according to claim 4, wherein the mask includes a plurality of first closure plates that extend in a direction orthogonal to an opposing-end direction of the gas outlet, and that are installed in the opposing-end direction at equal intervals; and a plurality of second closure plates that extend in the opposing-end direction and that are installed between adjacent closure plates of the plurality of first closure plates, and a number of second closure plates installed between the adjacent plurality of first closure plates is greater on sides nearer to the opposing ends of the gas outlet.

6. The contaminant removal device according to claim 1, wherein the object is a semiconductor wafer on which a plurality of structures are arranged in a length direction and a width direction, each structure of the plurality of structures has a lower strength against a force applied from a predetermined direction than against a force applied from a direction other than the predetermined direction, and the nozzle is disposed in an orientation in which a direction orthogonal to an opposing-end direction of the gas outlet is not matched with the predetermined direction.

7. The contaminant removal device according to claim 6, wherein the predetermined direction is a diagonal direction with respect to a direction in which the plurality of structures are arranged.

8. The contaminant removal device according to claim 1, further comprising a moving stage that moves the object and the nozzle relatively to each other.

9. A contaminant removal method for removing a contaminant attached to a surface of an object, the method comprising:

providing a contaminant removal device including:

a plurality of structures arranged in a length direction and a width direction, wherein the plurality of structures have a lower strength against a force applied from a predetermined direction, than against a force applied from a direction other than the predetermined direction a nozzle having a gas outlet formed by a plurality of aperture elements, wherein first aperture elements, from among the plurality of aperture elements, provided in opposing end portions of the gas outlet have smaller aperture areas than second aperture elements, from among the plurality of aperture elements, provided in a central portion of the gas outlet, an aperture ratio of each of the opposing end portions of the gas outlet is smaller than an aperture ratio of the central portion of the gas outlet, and the nozzle is disposed in an orientation in which a direction orthogonal to an opposing-end direction of the gas outlet is not matched with the predetermined direction; and spraying gas from the nozzle to remove the contaminant.

10. A contaminant removal device for removing a contaminant attached to an object, comprising:

a nozzle provided with a gas outlet that sprays gas to remove the contaminant, wherein opposing end portions of the gas outlet have a smaller aperture ratio than that in a central portion of the gas outlet, wherein the mask includes a plurality of first closure plates that extend in a direction orthogonal to an opposing-end direction of the gas outlet, and that are installed in the opposing-end direction at equal intervals; and a plurality of second closure plates that extend in the opposing-end direction and that are installed between adjacent closure plates of the plurality of first closure plates, and a number of second closure plates installed between the adjacent plurality of first closure plates is greater on sides nearer to the opposing ends of the gas outlet.

* * * * *